(12) United States Patent
LaCroix et al.

(10) Patent No.: US 8,580,006 B2
(45) Date of Patent: Nov. 12, 2013

(54) FILTER LOCK AND SEAL SYSTEM

(76) Inventors: Barry LaCroix, Corunna (CA); Paul LaCroix, Louisville, KY (US)

( * ) Notice: Subject to any disclaimer, the term of this patent is extended or adjusted under 35 U.S.C. 154(b) by 0 days.

(21) Appl. No.: 13/312,179

(22) Filed: Dec. 6, 2011

(65) Prior Publication Data

US 2012/0159913 A1 Jun. 28, 2012

Related U.S. Application Data

(60) Provisional application No. 61/425,860, filed on Dec. 22, 2010.

(51) Int. Cl.
*B01D 46/00* (2006.01)
(52) U.S. Cl.
USPC .......................... 55/378; 55/502; 55/DIG. 26
(58) Field of Classification Search
USPC ........................................................ 55/378
See application file for complete search history.

(56) References Cited

U.S. PATENT DOCUMENTS

| | | | | |
|---|---|---|---|---|
| 4,272,263 A * | 6/1981 | Hancock | ......................... | 55/377 |
| 4,292,057 A * | 9/1981 | Ulvestad et al. | ................ | 55/302 |
| 5,746,792 A * | 5/1998 | Clements et al. | ............ | 55/341.1 |
| 6,179,888 B1 * | 1/2001 | Mangiaforte | ................ | 55/341.1 |
| 6,858,052 B2 * | 2/2005 | Clements | ......................... | 55/377 |
| 7,186,284 B2 * | 3/2007 | Clements | ......................... | 55/377 |

* cited by examiner

*Primary Examiner* — Duane Smith
*Assistant Examiner* — Phillip Shao

(57) ABSTRACT

The present concept a filter lock and seal system for sealing a filter assembly to a tubesheet includes a filter assembly which includes filter media mounted between top and bottom end caps. The top end cap includes an annular seat portion extending longitudinally from the top of a lower flange and terminating at an annular radial outward projecting shoulder. The filter assembly further includes a snap band for sealing the filter assembly to the tubesheet and cooperatively seating against the annular seat portion. Wherein the snap band including a cavity and a deformable portion for engaging with a tubesheet end.

8 Claims, 4 Drawing Sheets

FILTER LOCK AND SEAL SYSTEM

The application claims priority from previously filed U.S. provisional patent application Ser. No. 61/425,860 titled FILTER LOCK & SEAL SYSTEM, which was filed on Dec. 22, 2010 by Barry LaCroix and Paul LaCroix.

FIELD OF THE INVENTION

The invention relates generally to pleated cartridge filters used in dust collectors and more particularly it relates to a locking mounting and sealing system for filter assemblies used within a dust collector or baghouse structure.

BACKGROUND OF THE INVENTION

Systems used for the removal of particulate matter from a fluid stream incorporating a dust collector are well known. Typically a dust collector or a baghouse is comprised of two sections, an inlet chamber and an outlet chamber separated by a metal plate, which is normally called a tubesheet. The tube sheet has several openings wherein cartridge assemblies is also known as cartridge filters are normally inserted from the outlet chamber side into the dirty inlet chamber portion. Filter assemblies are attached and sealed to the tubesheet requiring the fluid stream to be channeled through the filter assemblies prior to reaching the outlet chamber. To ensure that the particulate matter being filtered out of the fluid does not pass from the inlet chamber into the outlet chamber, leaks between the filter assembly and the tubesheet should be avoided. Therefore a seal is generally achieved by using a snap band as an interface between the tubesheet and the filter assembly. U.S. Pat. Nos. 6,858,052 and 5,746,792 describe the most common snap band systems and their application. The snap bands are normally comprised of an inter-flexible metal strap and a flexible outer cover normally made of material, which can be easily deformed to allow insertion into the tubesheet opening. The difficulty with the existing designs is that under normal operating conditions the filter assembly can lift from the tubesheet and break the seal between the inlet chamber 108 and the outlet chamber 110. Conditions which can cause the filter assembly to lift from the tubesheet include but are not limited to thermal variations in high temperature environments, vibrations, and operation of reverse flow pulsing to clean the loaded filter assemblies.

Therefore there is a need for a filter lock and sealing system which prevents unintentional lifting of the filter assemblies from the tubesheet and subsequent seal loss and optionally also provides a secondary seal between the snap band and the filter assemblies when excessive compression of the snap band creates a deleterious material set.

SUMMARY OF THE INVENTION

The present device a filter lock and seal system for sealing a filter assembly to a tubesheet comprises:
a) a filter assembly mounted to a top end cap;
b) wherein the top end cap includes an annular seat portion extending longitudinally from the top of a lower flange and terminating at an annular radial outward projecting shoulder;
c) the filter assembly further includes a snap band for installing the filter assembly into a tube sheet opening and sealing the filter assembly to the tubesheet;
d) wherein the snap band including a band cavity for engaging with a tubesheet end of the tube sheet opening in an installed position.

Preferably wherein the snap band includes a deformable portion covering over the band cavity which deforms into the band cavity in the installed position.

Preferably wherein the snap band including a reverse C shaped curled strip defining the band cavity.

Preferably wherein the snap band includes a flexible cover encapsulating the snap band, the flexible cover includes a deformable portion covering over the band cavity which deforms into the band cavity in the installed position.

Preferably wherein the flexible cover encapsulating the snap band and defining an annular seat surface on the inner side of the snap band for cooperatively engaging with the seat portion of the top end cap when in the installed position.

Preferably in the installed position a snap band bottom corner abuts against the radial outward shoulder.

Preferably wherein the snap band including an annular inner flexible strip adjacent to the flexible cover on the inner side of the snap band.

Preferably wherein the snap band including an annular metal strip sandwiched between inner flexible strip and the curled strip.

Preferably wherein the top end cap including an annular gasket seat for receiving a gasket therein, such that in the installed position the snap band top abuts against the gasket.

Preferably wherein the top end cap including an annular potting seat for receiving potting material therein for bonding the filter assembly to the top end cap.

Preferably wherein the filter assembly including a filter element.

Preferably including a filter assembly which includes filter media mounted between top and bottom end caps.

BRIEF DESCRIPTION OF THE DRAWINGS

The current concept will now be described by way of example only with reference to the following drawings in which.

DETAILED DESCRIPTION OF THE PREFERRED EMBODIMENTS

The present concept of Filter Lock & Seal System 100 is depicted in the attached figures.

Figure 1:
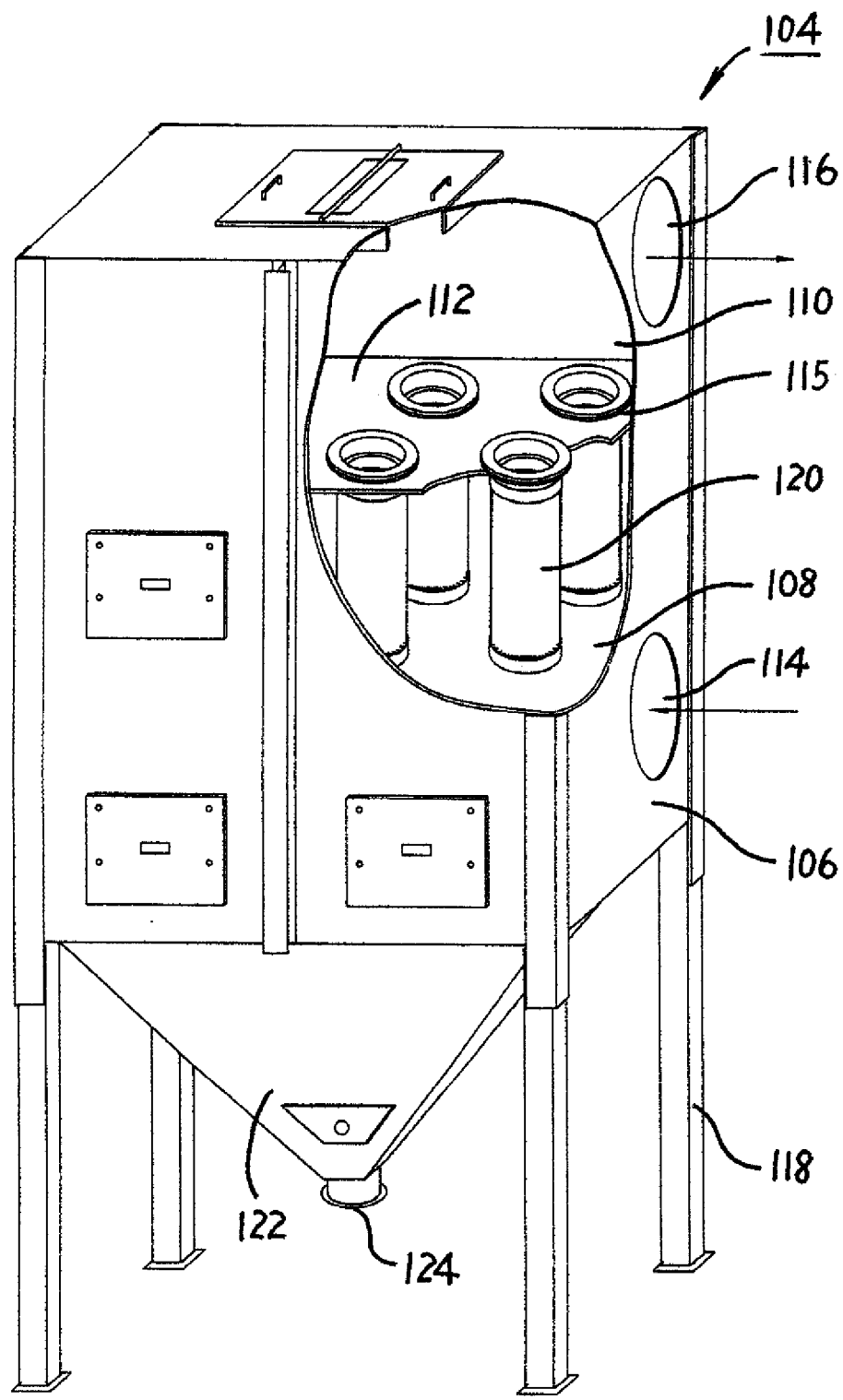
FIG. 1 is a perspective view of a partly sectioned baghouse/dust collector with filter assemblies mounted therein.

Referring first of all to FIG. 1 which depicts a baghouse or also known as a dust collector 104 includes the following major components namely a housing 106 which defines an inlet chamber 108, an outlet chamber 110 separated by tubesheet 112 having tube sheet openings 115 therein.

Filter assemblies 120 are fitted into tubesheet openings 115 thereby forcing any flow of fluid entering from intake port 114 to flow through the filter assemblies 120 and out through the outlet chamber 110 and out through the exhaust port 116. The dust collector 104 also includes mounting legs 118 and a hopper 122 having a hopper discharge 124. Some baghouse/dust collectors 104 are designed for reverse flow pulse cleaning to take place wherein the flow of fluid is momentarily and abruptly reversed in order to dislodge particulate matter from the filter assemblies 120 which drops down into hopper 122 and eventually can be discharged from hopper 122 through hopper discharge 124.

It is important that there be a very reliable seal between the filter assemblies 120 and the tubesheet 112 in order to prevent contaminates from transferring from the inlet chamber 108 through to the outlet chamber 110 without passing through a filter assembly 120. Ideally all of the fluid that is to be filtered is forced to flow through filter assemblies 120 thereby ensuring that maximum amount of filtering is taking place.

Figures 2, 2A:
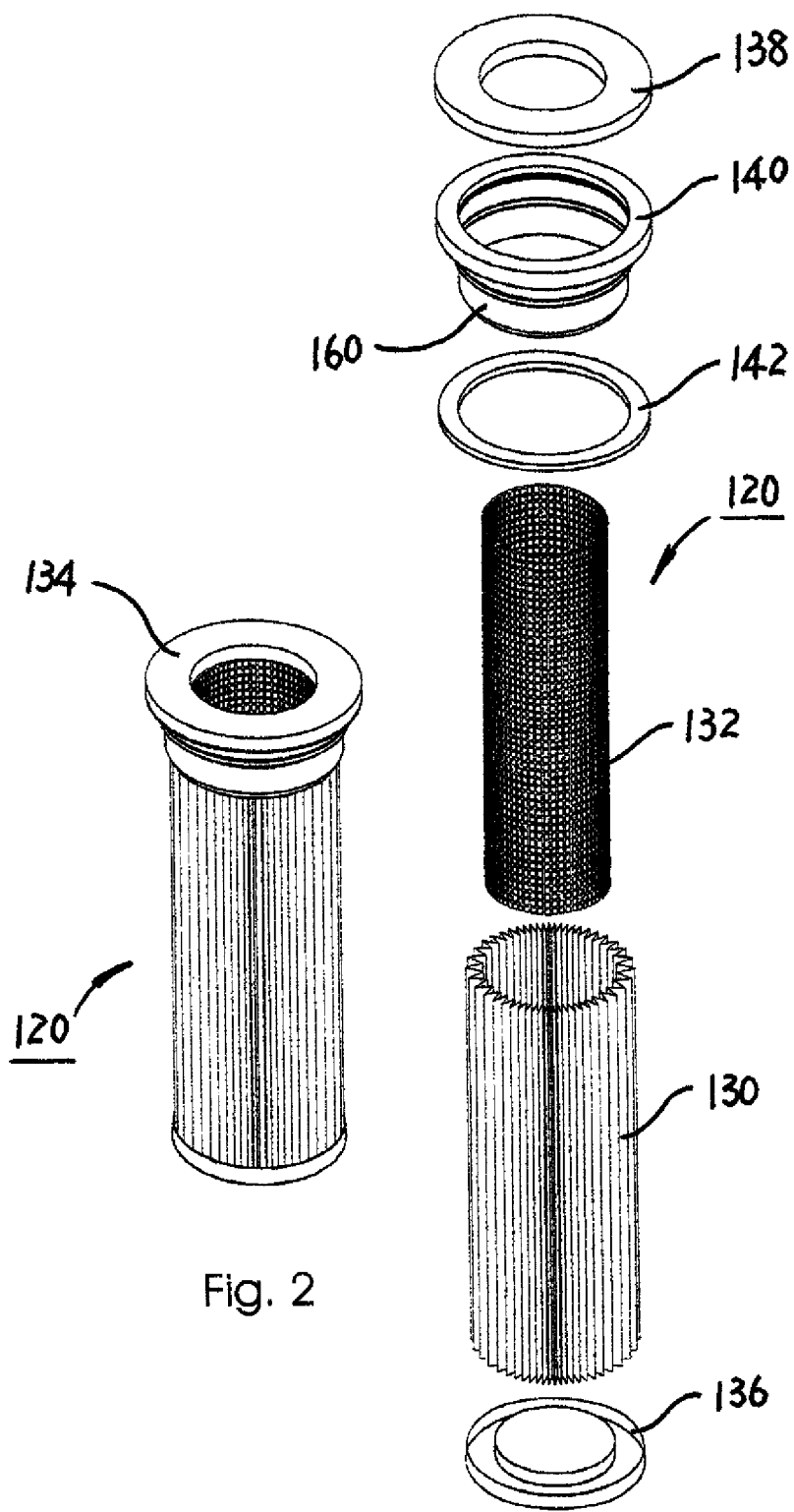
FIG. 2 is a top, side schematic perspective view of an assembled filter assembly.
FIG. 2A is an exploded perspective view of a typical filter assembly.

Referring now to FIG. 2 and FIG. 2A which shows an assembled filter assembly 120 in FIG. 2 and an exploded view of the components of a filter assembly 120 in FIG. 2A.

Filter assembly 120 includes filter element 130 which in the present case is a pleated type of filter element which is supported by a filter core 132 commonly made from expended metal or screen of metal or plastic. Filter assembly 120 further includes top end cap 134 and a bottom end cap 136 which support the filter element 130 and the filter core 132 there between.

Top end cap 134 includes an upper flange 138 which defines a potting seat 179. The upper flange 138 is normally rigidly connected to a lower flange 140, which includes a gasket seat 177 housing a gasket 142. Lower flange 140 also includes a collar 160. In addition a gasket 142 is placed onto a lower flange 140 in order to provide for secondary sealing.

Upper flange 138 is normally made of metal and is often spot welded to lower flange 140. Therefore the reader will note that filter assembly 120 includes a filter element 130 with pleated filter media formed into a cylindrical shape and a filter core 132, which maintains the filter element cylindrical shape. The filter element 130 and the core 132 are secured to the top end cap 134 and the bottom end cap 136 by a suitable potting compound when the end caps are fabricated from sheet metal or they are encased within polymer moulded end caps. The sheet metal fabricated top end cap upper flange 138 and lower flange 140 are normally spot welded together. A secondary gasket 142 can be made of any suitable material including paper, fabric, ceramic or elastomer and is bonded normally to the underside of the lower flange 140 of top end cap 134.

Figure 3:
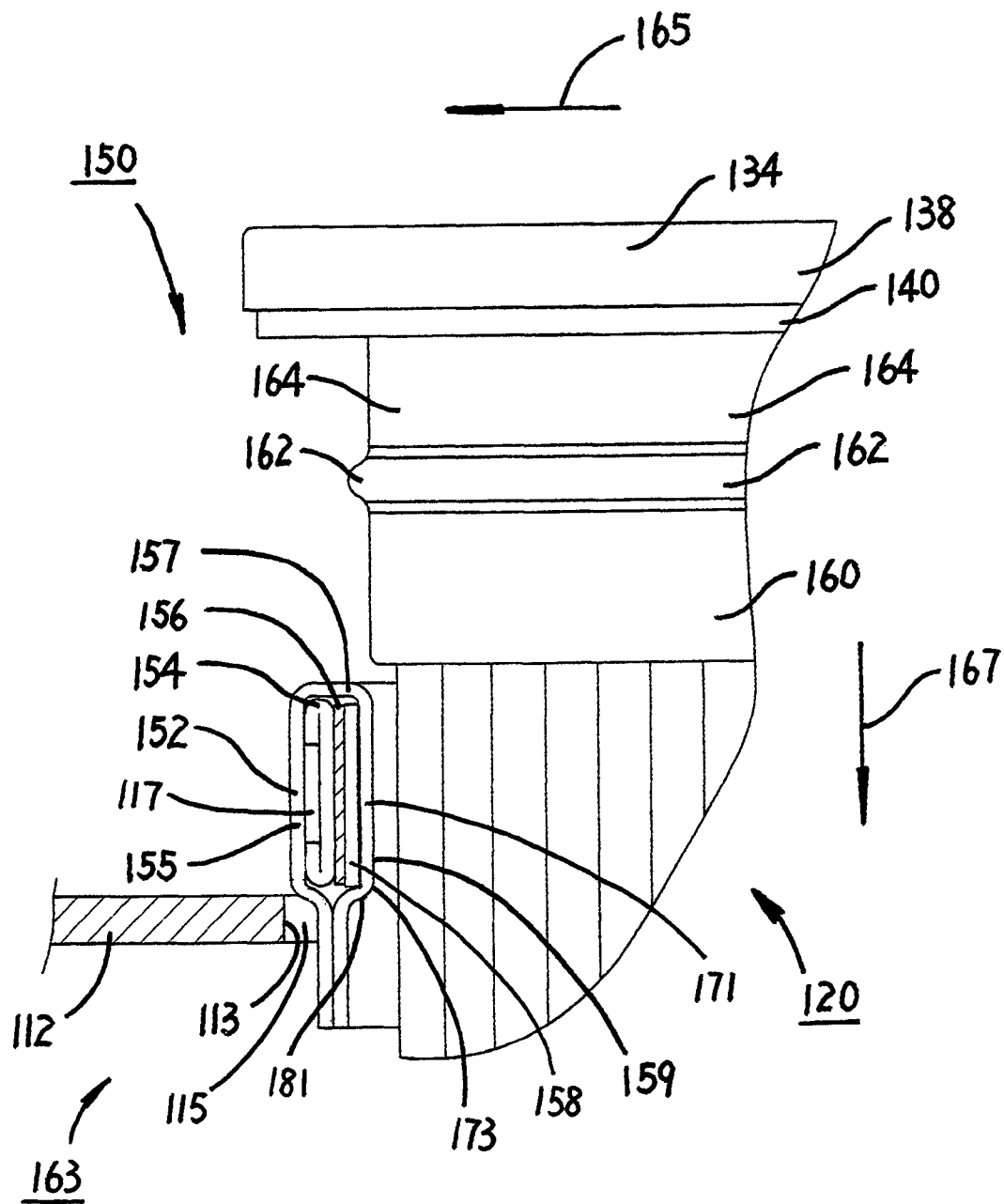
FIG. 3 is a partial schematic cross sectional assembly view of a filter assembly in the process of being mounted onto a tube sheet.

Referring now to FIG. 3 depicting a filter assembly 120 in the process of being mounted onto tube sheet 112, together with a snap band 150 in an unlocked position 163.

In order to mount a filter assembly 120 onto tube sheet 112 filter assembly 120 is urged downwardly in the longitudinal direction 167 until snap band 150 engages with tube sheet 112. By urging the filter assembly 120 into an installed position 170 as shown in FIG. 4 a seal is created between filter assembly 120 and tubesheet 112 as described below.

Snap band 150 includes the following annular components namely flexible cover 152 covering over a reverse C shaped curled strip 154 which is adjacent to metal strip 156 which is adjacent an inner flexible strip 158 which is all encapsulated by flexible cover 152. The a reverse C shaped curled strip defines a band cavity 117 for wedging the deformable portion 155 of flexible cover 152 therein preferably together with a portion of tube sheet end 113.

Figure 4:
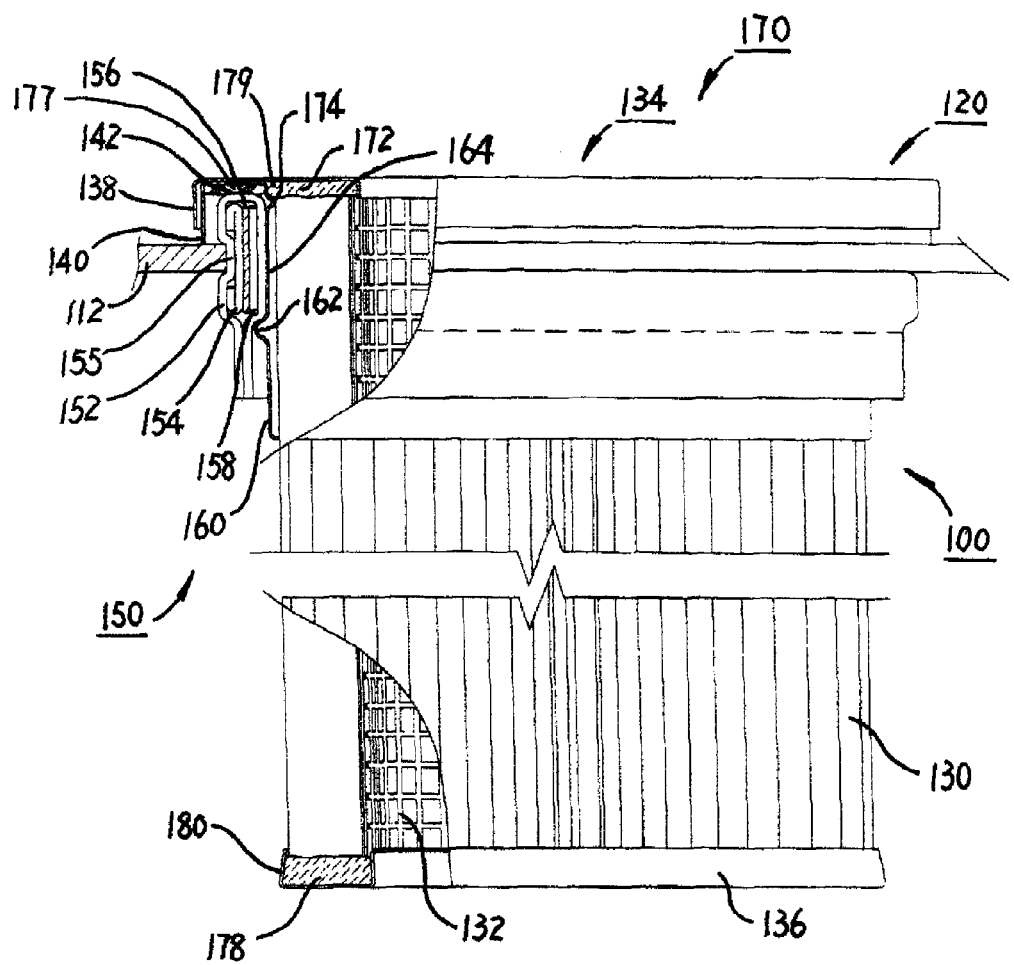
FIG. 4 is a partial cross sectional side elevational schematic view of a filter assembly mounted into a tube sheet opening.

Flexible cover 152 of snap band 150 includes a centrally located deformable portion 155 and a band cavity 117 which engages with tubesheet end 113 of tubesheet 112 when in the installed position 170 as shown in FIG. 4.

Snap band 150 also includes a seat surface 159 on the inner side 171 of the snap band 150 being an inner annular seating surface, which meets against annular seating portion 164 of lower flange 140 and also outward shoulder 162 at the snap band bottom corner 173.

Top end cap 134 includes upper flange 138 welded to lower flange 140, which includes a longitudinal collar portion 160. Collar 160 includes a seat portion 164 and a radial outward shoulder 162.

Referring now to FIG. 4 by urging filter assembly 120 downwardly along longitudinal direction 167 one can place filter assembly 120 into installed position 170 as shown in FIG. 4.

In installed position 170 tube sheet end 113 of tubesheet 112 deforms deformable portion 155 of flexible cover 152 and partially enters and wedges into band cavity 117 thereby creating a seal between a tubesheet end 113 and snap band 150.

Furthermore seat surface 159 is urged beyond the radial outward shoulder 162 until it meets and seats adjacent to a smooth flat seat portion 164 of collar 160. Thereby snap band 150 seals the top end cap 134 to tubesheet 112 by creating a seal between deformable portion 155 of flexible cover 152 and the tubesheet end 113 of tubesheet 112 as well as a seal between seat surface 159 and seat portion 164 of lower flange 140 of top end cap 134. The reader will note that a secondary gasket 142 is placed near the inner top portion of the lower flange 140 thereby meeting with snap band top 157 thereby creating a secondary seal between snap band 150 and top end cap 134.

The upper flange 138 combined with the lower flange 140 creates a cavity in which potting compound 172 is placed which secures pleated filter element 130 as well as filter core 132 therein.

A radially inward protrusion 174 on the lower flange 140 of top end cap 134 prevents the potting compound 172 with the filter element 130 and the filter core 132 from falling into inlet chamber 108. In other words radially inward protrusion 174 acts to lock potting compound 172 into top end cap 134.

The reader will note that the radial outward shoulder 162 of lower flange 140 engages snap band 150 just below the snap bands metal strap 156 and inner flexible strip 158 and locks the filter assembly 120 into installed position 170. The radial outward projecting shoulder 162 positioned just below the snap band 150 such that the entire inner side 171 contacts the smooth annular seat portion 164 and the radial outward shoulder 162 contacts and abuts against the snap band bottom side 181 at a snap band bottom corner 173.

The flexible cover 152, the curled strip 154 as well as the inner flexible strip 158 can be made of fabric or any other suitable material for this application.

The lower portion of filter assembly 120 includes end cap 136 secured to filter core 132 and pleated filter element 130 with a potting compound 178. The bottom end cap 136 has a radially inward tapered bottom outer edge 180 projecting over the potting compound thereby locking it into position.

The use of snap band 150 together with the top end cap 134 construction as shown depicted and described above creates a triple seal between the tube sheet 112 and the filter assembly 120.

The first seal is between tube sheet end 113 and the deformable portion 155 of flexible cover 152. The second seal is between the seat surface 159 of flexible cover 152 and the seat portion 164 of lower flange 140. The third seal is between the secondary gasket 142 and snap band top 157.

In this manner all precaution is taken to ensure that there is not accidental loss of seal between the filter assembly 120 and the tube sheet 112.

It should be apparent to persons skilled in the arts that various modifications and adaptation of this structure described above are possible without departure from the spirit of the invention the scope of which defined in the appended claim.

We claim:

1. A filter lock and seal system for sealing a filter assembly to a tubesheet comprises:
   a) a filter assembly mounted to a top end cap;
   b) wherein the top end cap includes a smooth flat annular seat portion extending longitudinally from the top of a lower flange at an annular radially inward protrusion and terminating at an annular radial outward projecting shoulder;
   c) the filter assembly further includes a snap band for installing the filter assembly into a tube sheet opening and sealing the filter assembly to the tubesheet;
   d) wherein the snap band including a band cavity for engaging with a tubesheet end of the tube sheet opening in an installed position;
   e) wherein the snap band including a C shaped curled strip defining the band cavity;
   f) wherein the snap band includes a flexible cover encapsulating the snap band, and the flexible cover includes a deformable portion covering over the band cavity which deforms into the band cavity in the installed position;
   g) wherein the radial outward projecting shoulder positioned just below the snap band such that the entire inner side of the snap band contacts the smooth flat annular seat portion and the radial outward shoulder contacts and abuts against the snap band bottom side at a snap band bottom corner.

2. The filter lock and seal system claimed in claim 1 wherein the flexible cover encapsulating the snap band and defining an annular seat surface on the inner side of the snap band for cooperatively engaging with the seat portion of the top end cap when in the installed position.

3. The filter lock and seal system claimed in claim 2 wherein the snap band including an annular inner flexible strip adjacent to the flexible cover on the inner side of the snap band.

4. The filter lock and seal system claimed in claim 1 wherein the snap band including an annular metal strip sandwiched between inner flexible strip and the curled strip.

5. The filter lock and seal system claimed in claim 1 wherein the top end cap including an annular gasket seat for receiving a gasket therein, such that in the installed position the snap band top abuts against the gasket.

6. The filter lock and seal system claimed in claim 1 wherein the top end cap including an annular potting seat for receiving potting material therein for bonding the filter assembly to the top end cap.

7. The filter lock and seal system claimed in claim 1 wherein the filter assembly including a filter element.

8. The filter lock and seal system claimed in claim 1 including a filter assembly which includes filter media mounted between top and bottom end caps.

* * * * *